(12) United States Patent
Cheng et al.

(10) Patent No.: US 12,395,086 B2
(45) Date of Patent: Aug. 19, 2025

(54) DRIVING CIRCUIT FOR DRIVING ELECTRONIC ELEMENT

(71) Applicant: I-SHOU UNIVERSITY, Kaohsiung (TW)

(72) Inventors: Chun-An Cheng, Kaohsiung (TW); Wen-Yi Yan, Kaohsiung (TW); Long-Fu Lan, Kaohsiung (TW); Cheng-Kuan Lin, Kaohsiung (TW); Sheng-Hong Hou, Kaohsiung (TW)

(73) Assignee: I-SHOU UNIVERSITY, Kaohsiung (TW)

( * ) Notice: Subject to any disclaimer, the term of this patent is extended or adjusted under 35 U.S.C. 154(b) by 94 days.

(21) Appl. No.: 18/418,378

(22) Filed: Jan. 22, 2024

(65) Prior Publication Data
US 2025/0167686 A1    May 22, 2025

(30) Foreign Application Priority Data
Nov. 17, 2023    (TW) .................................. 112144632

(51) Int. Cl.
*H02M 3/335* (2006.01)
*H05B 45/3725* (2020.01)

(52) U.S. Cl.
CPC .... *H02M 3/33569* (2013.01); *H05B 45/3725* (2020.01)

(58) Field of Classification Search
CPC ........................ H05B 45/3725; H02M 3/33569
See application file for complete search history.

(56) References Cited

U.S. PATENT DOCUMENTS

| | | | |
|---|---|---|---|
| 7,859,194 B2 | 12/2010 | Walker et al. | |
| 2015/0180354 A1* | 6/2015 | Sadwick | H05B 45/382 363/21.13 |
| 2015/0311808 A1* | 10/2015 | Shteynberg | H05B 47/165 315/307 |
| 2017/0006682 A1* | 1/2017 | Wang | G02F 1/1336 |

FOREIGN PATENT DOCUMENTS

| | | |
|---|---|---|
| TW | 201332263 | 8/2013 |
| TW | 201526699 | 7/2015 |
| TW | 202019234 | 5/2020 |
| TW | I692992 | 5/2020 |

OTHER PUBLICATIONS

"Office Action of Taiwan Counterpart Application", issued on Jul. 3, 2024, p. 1-p. 5.

* cited by examiner

*Primary Examiner* — Raymond R Chai
(74) *Attorney, Agent, or Firm* — JCIPRNET

(57) ABSTRACT

A driving circuit for driving an electronic element is provided. The drive circuit includes an inductive coupling circuit, a primary side circuit and a secondary side circuit. The inductive coupling circuit includes a primary winding and a secondary winding. The primary side circuit is electrically connected to an input voltage source, the primary winding and a first terminal of the electronic element. The secondary side circuit is electrically connected to the secondary winding, the primary side circuit and a second terminal of the electronic element. The driving circuit uses an electric energy stored in the primary side circuit and an electric energy stored in the secondary side circuit to drive the electronic element.

12 Claims, 7 Drawing Sheets

DRIVING CIRCUIT FOR DRIVING ELECTRONIC ELEMENT

CROSS-REFERENCE TO RELATED APPLICATION

This application claims the priority benefit of Taiwan application serial no. 112144632, filed on Nov. 17, 2023. The entirety of the above-mentioned patent application is hereby incorporated by reference herein and made a part of this specification.

BACKGROUND

Technical Field

The disclosure generally relates to an electronic circuit, and more particularly to a driving circuit for driving an electronic element.

Description of Related Art

Generally, DC driving circuit used to drive low-power electronic elements can be implemented using flyback driving circuit. However, currently, the flyback driving circuit cannot recover the power of the parasitic components in the flyback driving circuit during operation. Therefore, the conversion efficiency of the flyback driving circuit is not high.

Therefore, how to provide a driving circuit with high conversion efficiency is one of research focuses of those skilled in the art.

SUMMARY

The disclosure provides driving circuit with high conversion efficiency.

The driving circuit of the disclosure is used to drive the electronic element. The driving circuit includes an inductive coupling circuit, a primary side circuit and a secondary side circuit.

The inductive coupling circuit includes a primary winding and a secondary winding. The primary side circuit is electrically connected to an input voltage source, the primary winding and a first terminal of the electronic element. The secondary side circuit is electrically connected to the secondary winding, the primary side circuit and a second terminal of the electronic element. The driving circuit uses an electric energy stored in the primary side circuit and an electric energy stored in the secondary side circuit to drive the electronic element.

Based on the above, the secondary side circuit is electrically connected to the primary side circuit. The driving circuit uses the electric energy stored in the primary side circuit and the electric energy stored in the secondary side circuit to drive the electronic element. As a result, the driving circuit of the disclosure has higher conversion efficiency.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Figure 1:
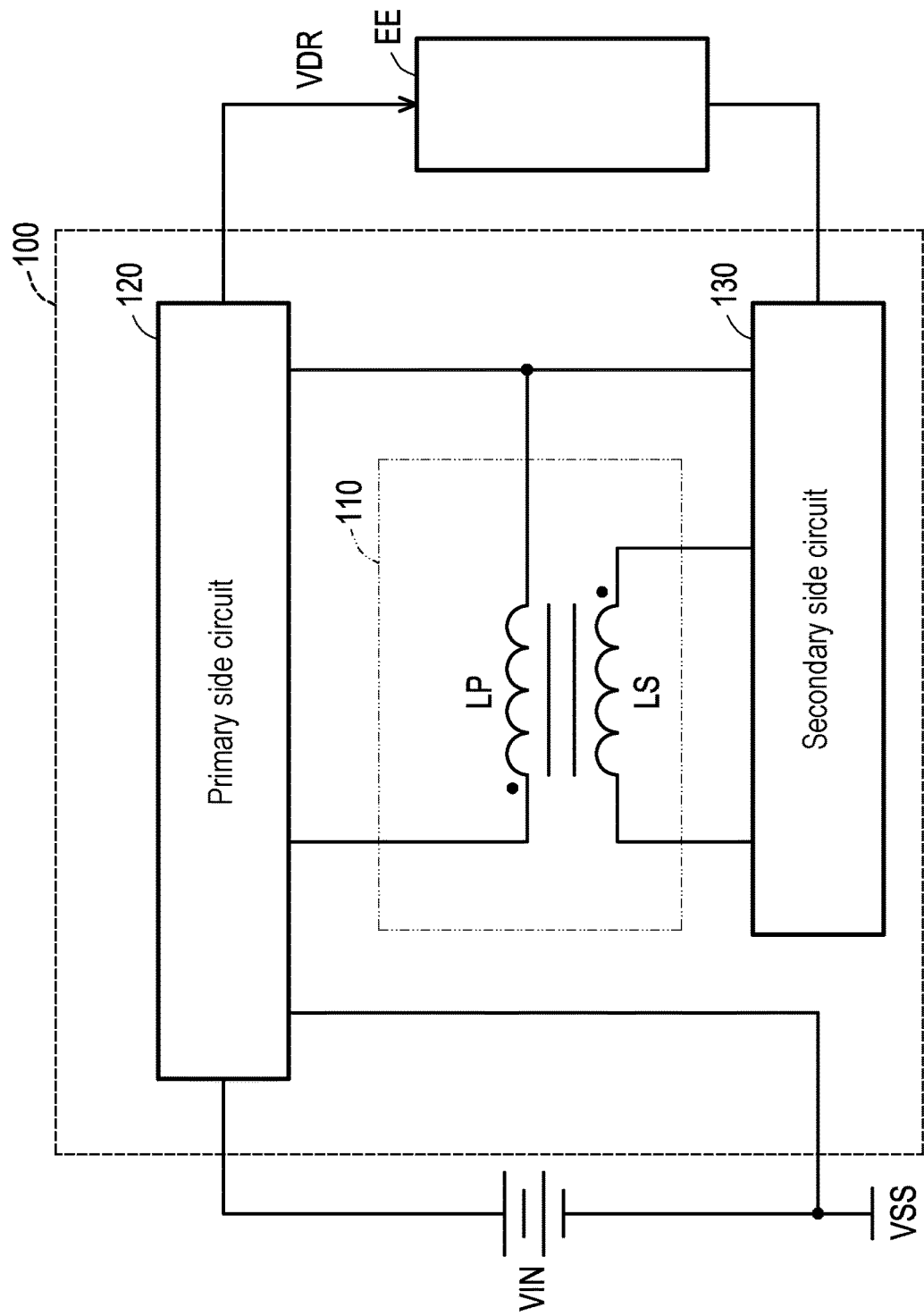
FIG. 1 illustrates a schematic diagram of a driving circuit according to an embodiment of the disclosure.

Please refer to FIG. 1, FIG. 1 illustrates a schematic diagram of a driving circuit according to an embodiment of the disclosure. In the embodiment, a driving circuit 100 is used to drive the electronic element EE. The driving circuit 100 includes an inductive coupling circuit 110, a primary side circuit 120 and a secondary side circuit 130. The inductive coupling circuit 110 includes a primary winding LP and a secondary winding LS. The primary circuit 120 is electrically connected to an input voltage source VIN, the primary winding LP and a first terminal of the electronic element EE. The secondary side circuit 130 is electrically connected to the secondary winding LS, the primary side circuit 120 and a second terminal of the electronic element EE. The driving circuit 100 uses the electric energy stored in the primary side circuit 120 and the electric energy stored in the secondary side circuit 130 to drive the electronic element EE. The driving circuit 100 uses an electric energy stored in the primary circuit 120 and a an electric energy stored in the secondary side circuit 130 to provide a driving voltage VDR. The driving voltage VDR is used to drive electronic element EE.

It should be noted, the secondary side circuit 130 is electrically connected to the primary side circuit 120. The driving circuit 100 uses the electric energy stored in the primary side circuit 120 and the electric energy stored in the secondary side circuit 130 to drive the electronic element EE. Therefore, the driving circuit 100 has higher conversion efficiency (for example, a DC-DC conversion efficiency).

In the embodiment, the input voltage source VIN is a DC voltage source. The inductive coupling circuit 110 may be implemented by an inductive coupler or a transformer.

The electronic element EE may be a light source element including a light emitting diode (LED). For example, the electronic element EE can be a germicidal disinfection lamp including an ultraviolet light emitting diode (UV LED) or a deep ultraviolet light emitting diode (UVC LED).

Figure 2:
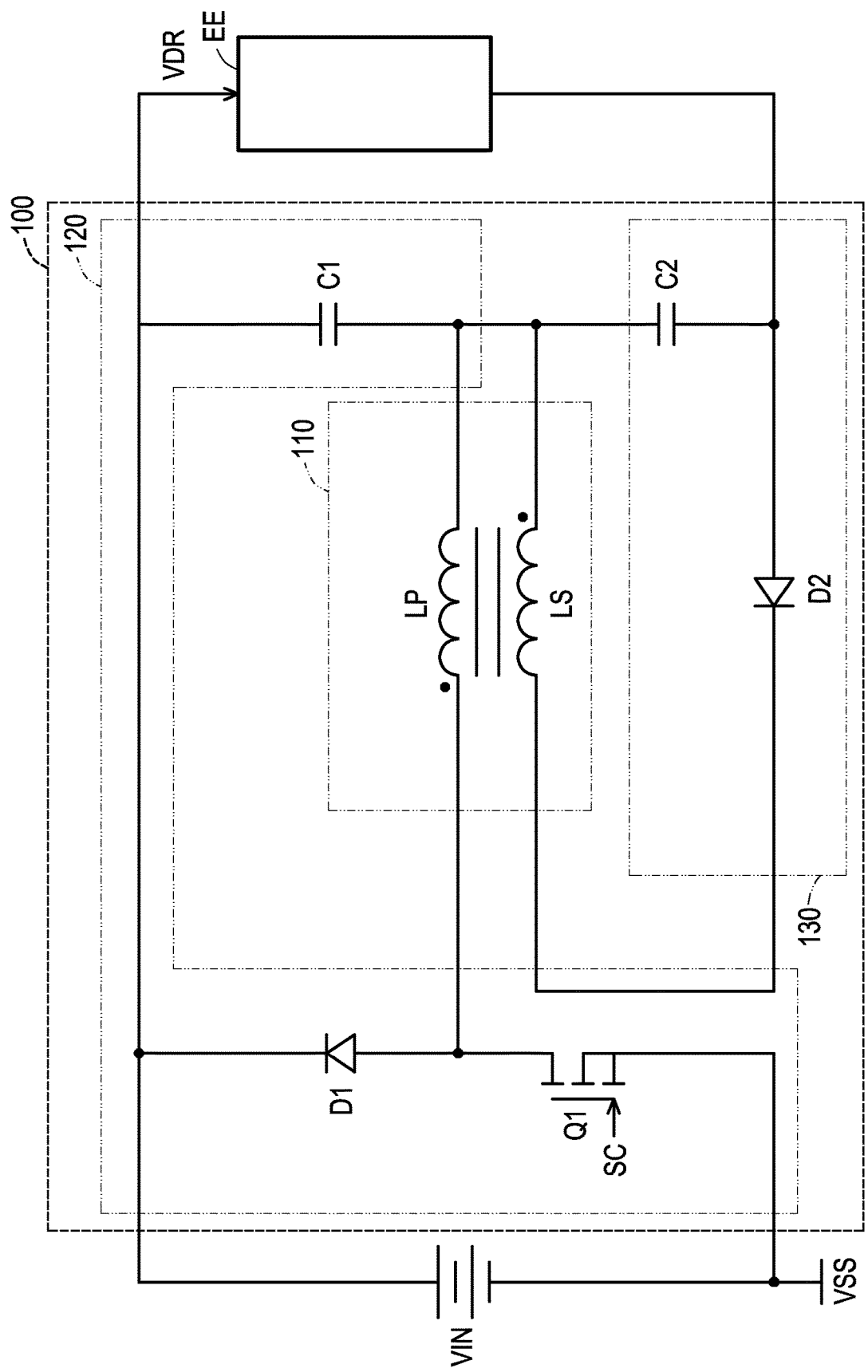
FIG. 2 illustrates a schematic diagram of a driving circuit according to an embodiment of the disclosure.

The circuit implementation of the driving circuit 100 will be further described with an example. Please refer to FIG. 2, FIG. 2 illustrates a schematic diagram of a driving circuit according to an embodiment of the disclosure. In the embodiment, the primary side circuit 120 includes a diode D1, a capacitor C1 and a power switch Q1. A cathode of the diode D1 is electrically connected to the input voltage source VIN. An anode of diode D1 is electrically connected to a first terminal of the primary winding LP. A first terminal of the capacitor C1 is electrically connected to the cathode of diode D1 and a first terminal of the electronic element EE. A second terminal of the capacitor C1 is electrically connected to a second terminal of the primary winding LP. A first terminal of the power switch Q1 is electrically connected to the anode of the diode D1. A second terminal of the power switch Q1 is electrically connected to a reference low voltage VSS (for example, ground). A control terminal of the power switch Q1 receives a control signal SC.

In the embodiment, the secondary side circuit 130 includes a capacitor C2 and a diode D2. A first terminal of the capacitor C2 is electrically connected to the second terminal of the capacitor C1, the second terminal of the primary winding LP and a first terminal of the secondary winding LS. A second terminal of the capacitor C2 is electrically connected to a second terminal of the electronic element EE. An anode of the diode D2 is electrically connected to the second terminal of the capacitor C2. A cathode of diode D2 is electrically connected to a second terminal of the secondary winding LS.

In the embodiment, the capacitors C1 and C2 are connected in series between the first terminal of the electronic element EE and the second terminal of the electronic element EE. Therefore, the driving circuit 100 uses the electric energy stored in the capacitors C1 and C2 to drive the electron element EE.

It should be noted, in the embodiment, the driving circuit 100 is implemented by the capacitors C1, C2, the diodes D1, D2, the power switch Q1 and the inductive coupling circuit 110. There are not many components required for the driving circuit 100. Therefore, the size of the driving circuit 100 can be very small. The cost of the driving circuit 100 can also be very low.

Figure 3:
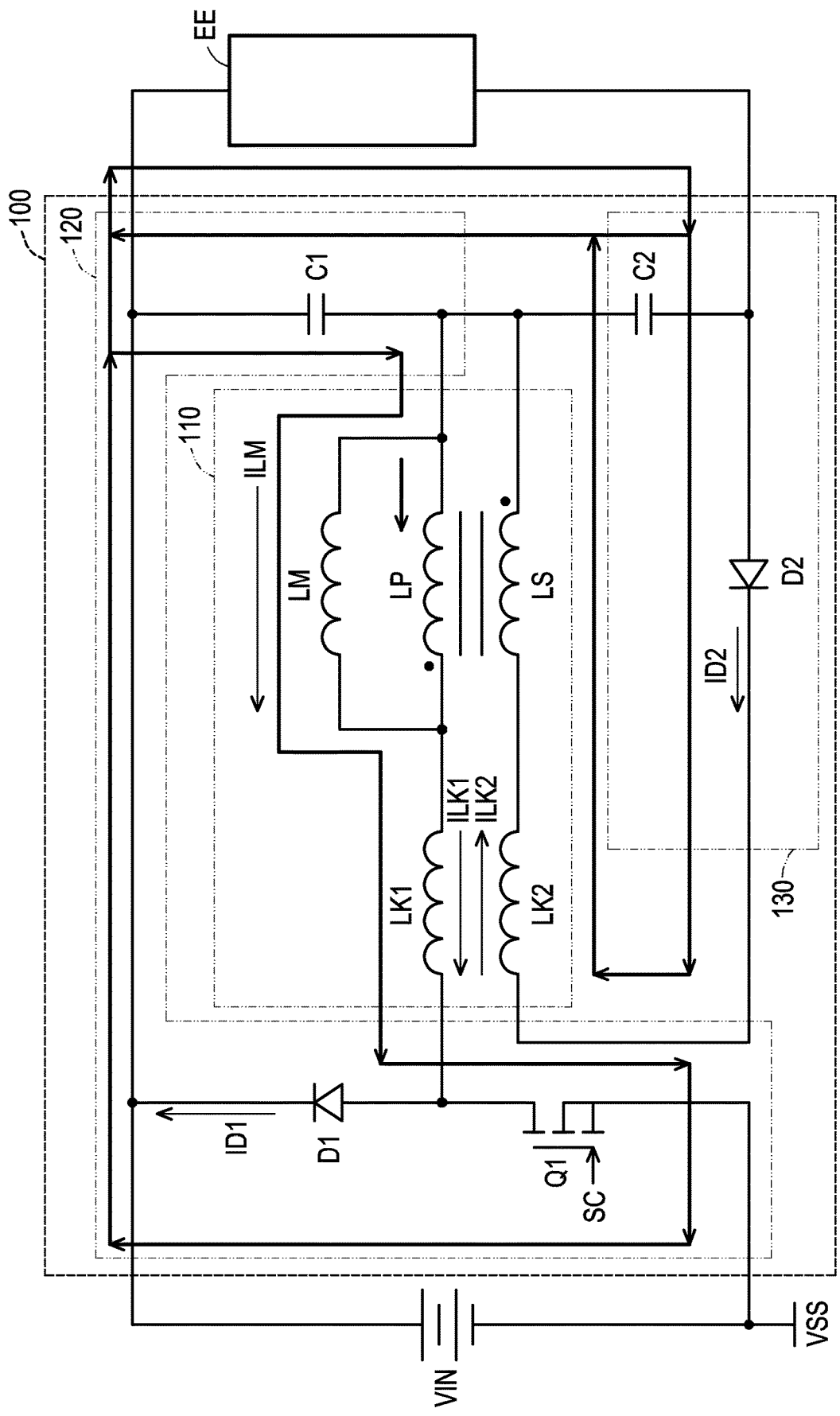
FIG. 3 illustrates a diagram of an operation of a driving circuit in a first status according to an embodiment of the disclosure.
Figure 4:
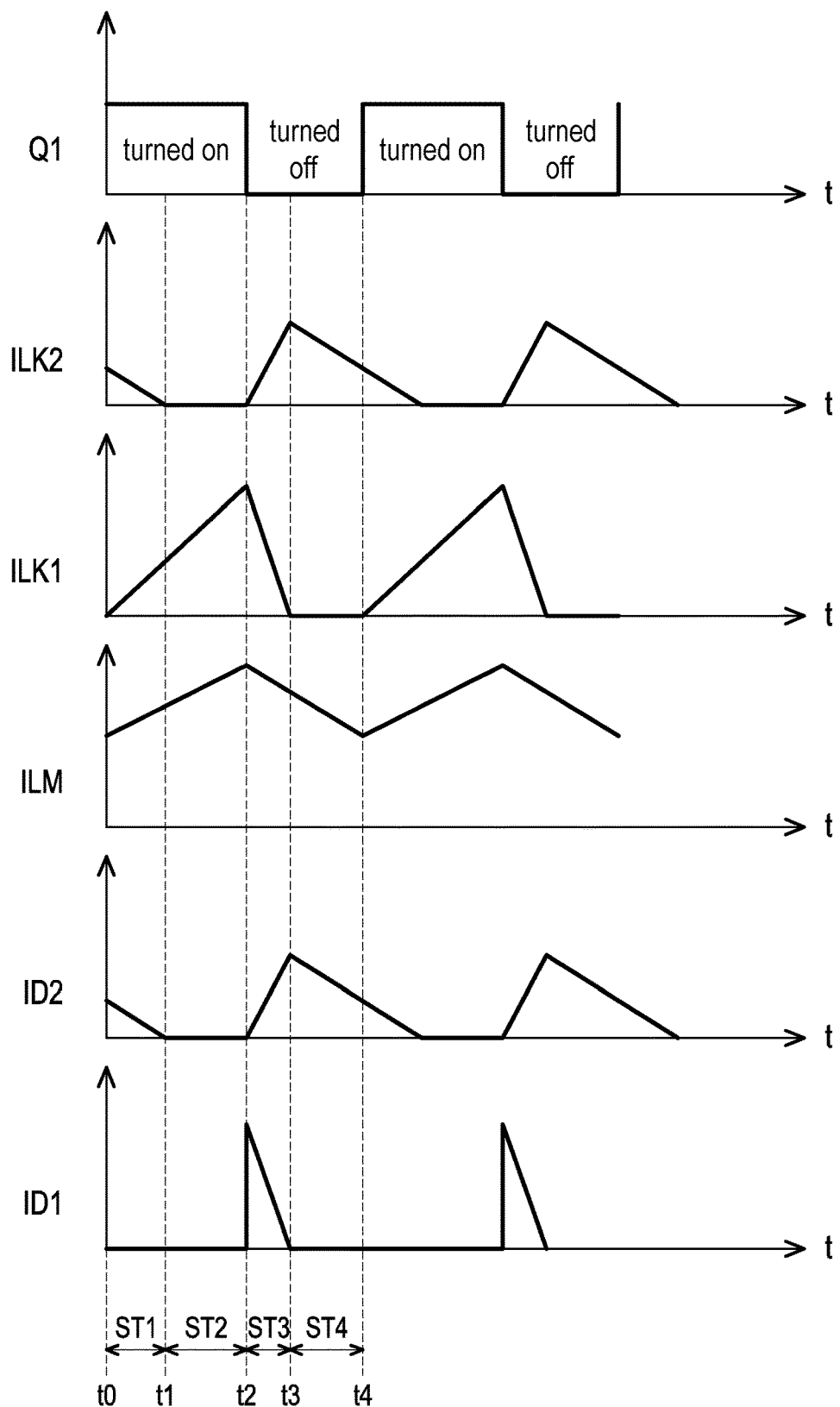
FIG. 4 illustrates a schematic diagram of waveforms according to an embodiment of the disclosure.

The operation of the driving circuit 100 will be described below. Please refer to FIG. 3 and FIG. 4. FIG. 3 illustrates a diagram of an operation of a driving circuit in a first status according to an embodiment of the disclosure. FIG. 4 illustrates a schematic diagram of waveforms according to an embodiment of the disclosure. In the embodiment, during the operation of the driving circuit 100, the inductive coupling circuit 110 generates a parasitic leakage inductor LK1 and a parasitic magnetizing inductor LM connected to the primary side circuit 120. In addition, during the operation of the driving circuit 100, the inductive coupling circuit 110 also generates a parasitic leakage inductor LK2 connected to the secondary side circuit 130.

Specifically, the parasitic leakage inductor LK1 is electrically connected between the first terminal of the primary winding LP and the anode of the diode D1. The parasitic magnetizing inductor LM is electrically connected between the first terminal of the primary winding LP and the second terminal of the primary winding LP. The parasitic leakage inductor LK2 is electrically connected between the second terminal of the secondary winding LS and the cathode of the diode D2.

In a first status ST1 between a time point t0 and a time point t1, the power switch Q1 is turned on. The anode of the diode D1 has low voltage. The diode D1 is cut off in a reverse bias status. Therefore, a current value of current ID1 flowing through the diode D1 is equal to zero. An electric energy of the input voltage source VIN is provided to the capacitor C1, the parasitic leakage inductor LK1 and the parasitic magnetizing inductor LM. Therefore, a current value of a current ILK1 flowing through the parasitic leakage inductor LK1 and a current value of a current ILM flowing through the parasitic magnetizing inductor LM are increased. In addition, in the first status ST1, the diode D2 is turned on based on a previous period (that is, previous status), so as to release (recovery) an electric energy stored in the parasitic leakage inductor LK2 to capacitor C2. Therefore, in first status ST1, the current value of the current ILK2 flowing through the parasitic leakage inductor LK2 is gradually decreased. The current value of the current ID2 flowing through the diode D2 is also gradually decreased. In the first status ST1, the driving circuit 100 uses the electric energy stored in the capacitor C1 and the electric energy stored in the capacitor C2 to drive the electronic element EE.

When the current value of the current ILK2 flowing through the parasitic leakage inductor LK2 drops to zero at time point t1, the driving circuit 100 enters a second status ST2 from the first status ST1 at the time point t1.

Figure 5:
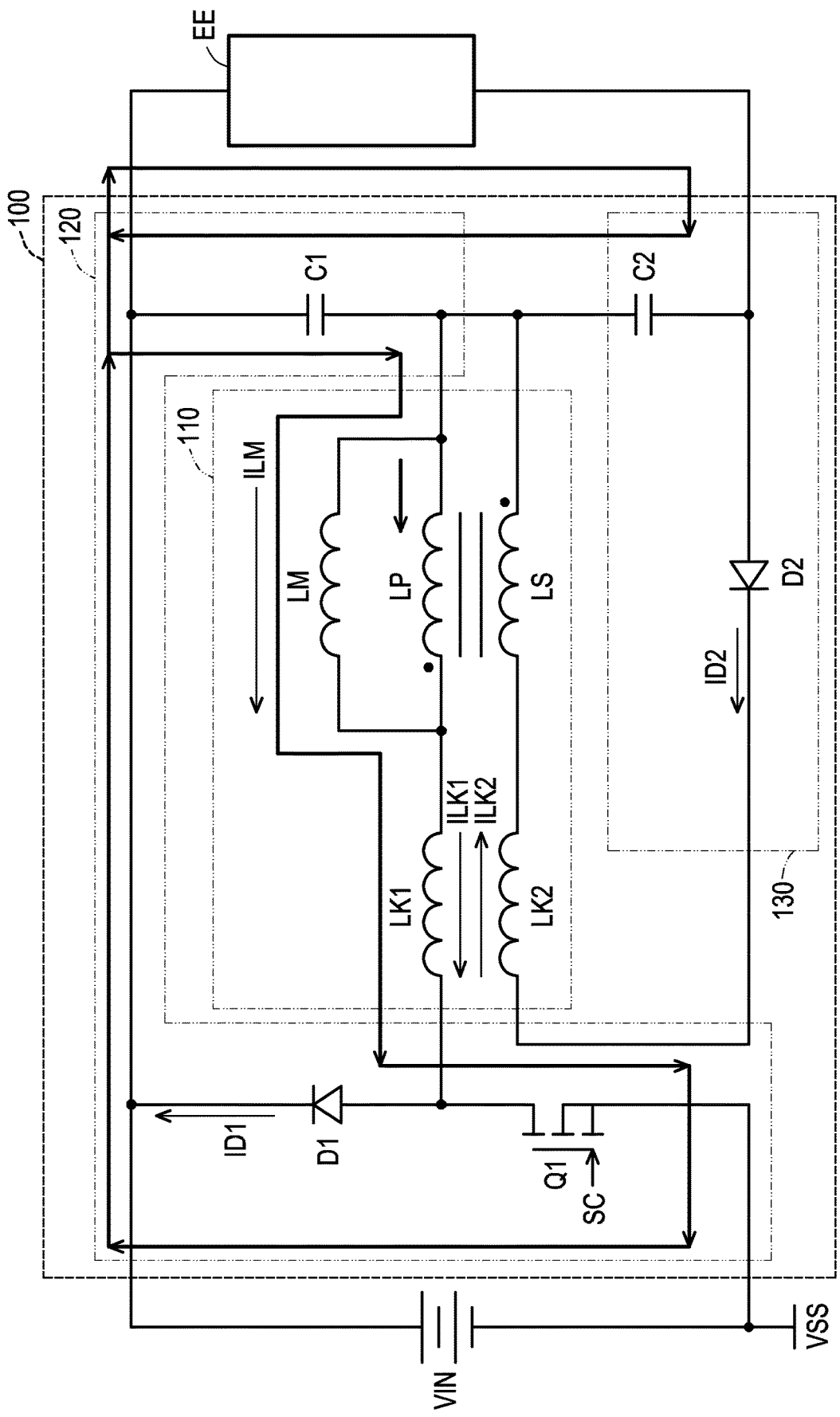
FIG. 5 illustrates a diagram of an operation of a driving circuit in a second status according to an embodiment of the disclosure.

Please refer to FIG. 4 and FIG. 5. FIG. 5 illustrates a diagram of an operation of a driving circuit in a second status according to an embodiment of the disclosure. In the second status ST2 between the time point t1 and a time point t2, the power switch Q1 is still turned on. The diode D1 is still cut off. The current value of the current ILK2 flowing through the parasitic leakage inductor LK2 is equal to zero. Therefore, the diode D2 is cut off (equivalently cut off) in the second status ST2. The current value of the current ID2 flowing through the diode D2 is also equal to zero. In second status ST2, the current value of the current ILK1 flowing through the parasitic leakage inductor LK1 and the current value of current ILM flowing through the parasitic magnetizing inductor LM are increased continuously. Therefore, in the second status ST2, the driving circuit 100 also uses the electric energy stored in the capacitor C1 and the electric energy stored in the capacitor C2 to drive the electronic element EE.

The power switch Q1 is turned off at the time point t2. Therefore, the driving circuit 100 enters a third status ST3 from the second status ST2 at the time point t2.

Figure 6:
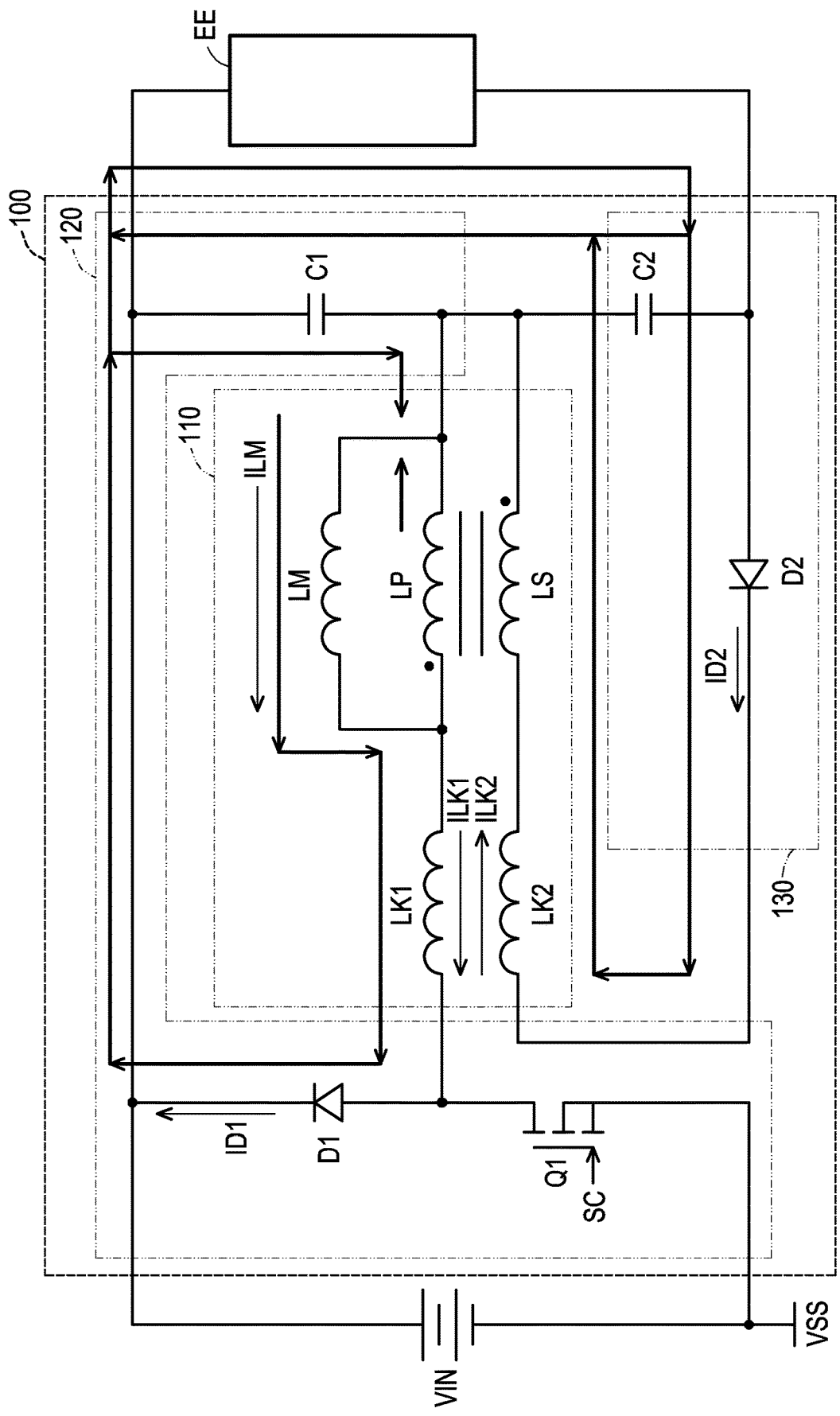
FIG. 6 illustrates a diagram of an operation of a driving circuit in a third status according to an embodiment of the disclosure.

Please refer to FIG. 4 and FIG. 6. FIG. 6 illustrates a diagram of an operation of a driving circuit in a third status according to an embodiment of the disclosure. In the third status ST3 between the time point t2 and a time point t3, the power switch Q1 is turned off. Therefore, the diode D1 is turned on in a forward bias status. The current value of current ID1 flowing through the diode D1 is increased. In addition, the driving circuit 100 provides (recycles) the electric energy stored in the parasitic leakage inductor LK1 and the electric energy of the parasitic magnetizing inductor LM to the capacitors C1, C2, the parasitic leakage inductor LK2 and the electronic element EE. The current value of the current ILK2 flowing through the parasitic leakage inductor LK2 is increased. The diode D2 is turned on. The current value of the current ID2 flowing through diode D2 is also increased.

In the third status ST3, the current value of the current ILK1 flowing through the parasitic leakage inductor LK1 and the current value of the current ILM flowing through the parasitic magnetizing inductor LM are gradually decreased.

When the current value of the current ILK1 flowing through the parasitic leakage inductor LK1 drops to zero at the time point t3, the driving circuit 100 enters a fourth status ST4 from the third status ST3 at the time point t3.

Figure 7:
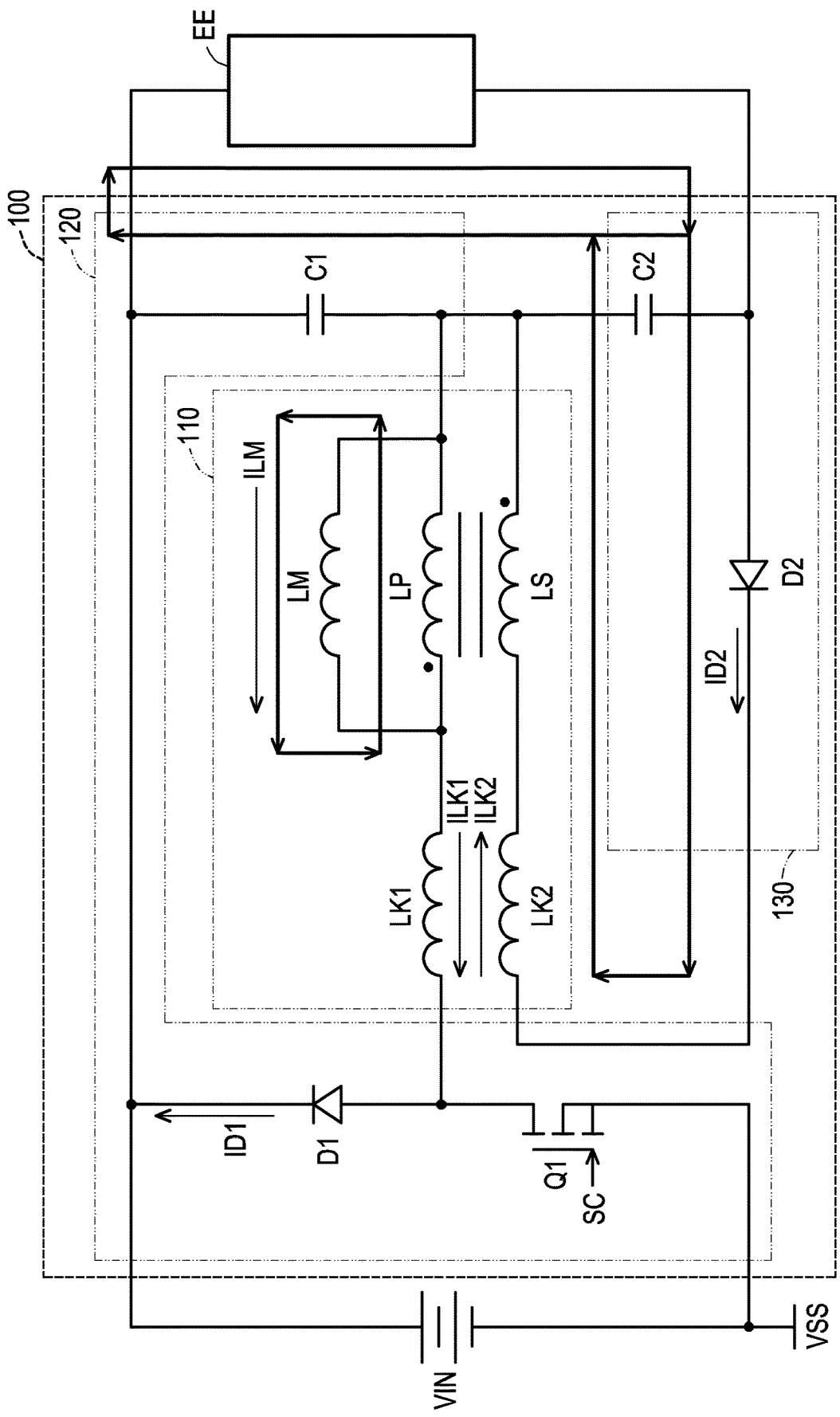
FIG. 7 illustrates a diagram of an operation of a driving circuit in a fourth status according to an embodiment of the disclosure.

Please refer to FIG. 4 and FIG. 7. FIG. 7 illustrates a diagram of an operation of a driving circuit in a fourth status according to an embodiment of the disclosure. In the fourth status ST4 between the time point t3 and a time point t4, the power switch Q1 is still turned off. The current value of the current ILK1 flowing through the parasitic leakage inductor LK1 is equal to zero in the fourth status ST4. The current value of the current ID1 flowing through the diode D1 is also equal to zero. The diode D1 is cut off (equivalently cut off). Therefore, in the fourth status ST4, the driving circuit 100 does not supply power to the capacitor C1.

In the fourth status ST4, the parasitic magnetizing inductor LM and the primary winding LP together form a current loop. The current value of the current ILM flowing through the parasitic magnetizing inductor LM will gradually decrease. In the fourth status ST4, the diode D2 is still turned on. Therefore, the driving circuit 100 provides (recycles) the electric energy stored in the parasitic leakage inductor LK2 to the capacitor C2.

In the fourth status ST4, the driving circuit 100 also uses the electric energy stored in the capacitor C1 and the electric energy stored in the capacitor C2 to drive the electronic element EE.

The power switch Q1 is turned off at the time point t4. Therefore, the driving circuit 100 enters the first status ST1 from the fourth status ST4 at the time point t4.

In view of the foregoing, the driving circuit of the disclosure the includes inductive coupling circuit, the primary side circuit and the secondary side circuit. The secondary side circuit is electrically connected to the primary circuit. The driving circuit uses the electric energy stored in the primary side circuit and the electric energy stored in the secondary side circuit to drive the electronic element. Therefore, the driving circuit of the disclosure has higher conversion efficiency. In addition, the electric energy stored in a parasitic leakage inductor of the inductive coupling circuit can be recovered into the capacitors of the primary circuit and the secondary side circuit.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driving circuit for driving an electronic element, comprising:
   an inductive coupling circuit, comprising
   a primary winding and a secondary winding;
   a primary side circuit, electrically connected to an input voltage source, the primary winding and a first terminal of the electronic element; and
   a secondary side circuit, electrically connected to the secondary winding, the primary side circuit and a second terminal of the electronic element, wherein
   the driving circuit uses an electric energy stored in the primary side circuit and an electric energy stored in the secondary side circuit to drive the electronic element wherein
   the primary side circuit comprises:
   a first diode, a cathode of the first diode is electrically connected to the input voltage source, and an anode of the first diode is electrically connected to a first terminal of the primary winding;
   a first capacitor, a first terminal of the first capacitor is electrically connected to the cathode of the first diode and the first terminal of the electronic element, the second terminal of the first capacitor is electrically connected to a second terminal of the primary winding; and
   a power switch, a first terminal of the power switch is electrically connected to the anode of the first diode, a second terminal of the power switch is electrically connected to a reference low voltage, and a control terminal of the power switch receives a control signal.

2. The driving circuit of claim 1, wherein the electronic element is a light source element comprising a light emitting diode.

3. The driving circuit of claim 1, wherein the secondary side circuit comprises:
   a second capacitor, a first terminal of the second capacitor is electrically connected to the second terminal of the first capacitor, the second terminal of the primary winding and a first terminal of the secondary winding, a second terminal of the second capacitor is electrically connected to the second terminal of the electronic element; and
   a second diode, an anode of the second diode is electrically connected to the second terminal of the second capacitor, a cathode of the second diode is electrically connected to a second terminal of the secondary winding.

4. The driving circuit of claim 3, during an operation of the driving circuit, the inductive coupling circuit generates a first parasitic leakage inductor and a parasitic magnetizing inductor connected to the primary side circuit, and generates a second parasitic leakage inductor connected to the secondary side circuit.

5. The driving circuit of claim 4, wherein in a first status:
   the power switch is turned on,
   the first diode is cut off,
   the input voltage source provides an electric energy to the first capacitor, the first parasitic leakage inductor and the parasitic magnetizing inductor,
   the second diode is turned on based on a previous period, thereby releasing an electric energy stored in the second parasitic leakage inductor to the second capacitor, and
   the driving circuit uses the electric energy stored in the first capacitor and the electric energy stored in the second capacitor to drive the electronic element.

6. The driving circuit of claim 5, wherein when a current value of a current flowing through the second parasitic leakage inductor drops to zero, the driving circuit enters a second status from the first status.

7. The driving circuit of claim 6, wherein in the second status:
   the power switch is turned on,
   the first diode and the second diode are cut off, and
   the driving circuit uses the electric energy stored in the first capacitor and the electric energy stored in the second capacitor to drive the electronic element.

8. The driving circuit of claim 6, wherein when the power switch is turn off, the driving circuit enters a third status from the second status.

9. The driving circuit of claim 8, wherein in the third status:
   the first diode and the second diode are turned on, and the driving circuit provides an electric energy stored in the first parasitic leakage inductor and an electric energy of the parasitic magnetizing inductor to the first capacitor, the second capacitor, the second parasitic leakage inductor and the electronic element.

10. The driving circuit of claim 8, wherein when a current value of a current flowing through the first parasitic leakage inductor drops to zero, the driving circuit enters a fourth status from the third status.

11. The driving circuit of claim 10, wherein in the fourth status:
the first diode is cut off,
the second diode is turned on,
the power switch is turned off,
the driving circuit provides the electric energy stored in the second parasitic leakage inductor to the second capacitor, and
the driving circuit uses the electric energy stored in the first capacitor and the electric energy stored in the second capacitor to drive the electronic element.

12. The driving circuit of claim 10, wherein when the power switch is turned on, the driving circuit enters the first status from the fourth status.

\* \* \* \* \*